US006979172B1

(12) United States Patent
Mackenzie

(10) Patent No.: US 6,979,172 B1
(45) Date of Patent: Dec. 27, 2005

(54) ENGINE BLADE CONTAINMENT SHROUD USING QUARTZ FIBER COMPOSITE

(75) Inventor: Sprague Benjamin Mackenzie, Rootstown, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 8 days.

(21) Appl. No.: 10/335,983

(22) Filed: Jan. 2, 2003

Related U.S. Application Data

(60) Provisional application No. 60/345,581, filed on Jan. 3, 2002.

(51) Int. Cl.$^7$ .............................................. F01D 21/00
(52) U.S. Cl. ..................... 415/9; 415/173.3; 415/174.2
(58) Field of Search ..................... 415/9, 173.1, 173.3, 415/173.4, 174.2, 174.4, 197, 200

(56) References Cited

U.S. PATENT DOCUMENTS

| | | |
|---|---|---|
| 5,403,148 A | 4/1995 | Forrester |
| 5,516,257 A | 5/1996 | Kasprow et al. |

(Continued)

OTHER PUBLICATIONS

S-2 Glass® Fiber. Datasheet [online]. MatWeb [retrieved on Jan. 5, 2005]. Retrieved from the Internet: <URL: http://www.matweb.com/search/SpecificMaterial.asp?bassnum=CGF005>.*

AR-Glass Fiber, Generic. Datasheet [online]. MatWeb [retrieved on Jan. 5, 2005]. Retrieved from the Internet: <URL: http://www.matweb.com/search/SpecificMaterial.asp?bassnum=CGF007>.*

DuPont Kevlar® Aramid Fiber. Datasheet [online]. MatWeb [retrieved on Jan. 5, 2005]. Retrieved from the Internet: <URL: http://www.matweb.com/search/SpecificMaterial.asp?bassnum=PDUKEV49>.*

Search Results [online]. MatWeb [retrieved on Jan. 5, 2005]. Retrieved from the Internet: <URL: http://www.matweb.com/search/GetProperty.asp>.*

Wallenberger, F. T. et al. 'Glass Fibers' [online]. ASM International [retrieved on Jan. 5, 2005]. Retrieved from the Internet: <UR http://www.asminternational.org/Template.cfm?Section=BrowsebyTopic&template=Ecommerce/FileDisplay.cfm&file=ACF7D8.df >.*

Roberts, Gary D. et al. "Impact Testing of Composites for Aircraft Engine Fan Cases." *American Institute of Aeronautics and Astronautics*. AIAA-2001-1633. 1-11.

Kandebo, Stanley W. "Upcoming Blade Tests Aimed at Growth GE90." *Aviation Week & Space Technology*. (May 1, 1999): 40-41.

Clements, Linda L. "Composite radomes protect and perform." *High Performance Composites*. (09/10.2000): 44-47.

"NASA Aeronautics Cyberpostcards: General Aviation Propulsion Program." http://www-psao.grc.nasa.gov/cards/493103520A.html accessed Sep. 6, 2001.

*Primary Examiner*—Edward K. Look
*Assistant Examiner*—Richard A. Edgar
(74) *Attorney, Agent, or Firm*—Toler, Larson & Abel, LLP

(57) ABSTRACT

An engine fan containment shroud including a containment structure composed of a composite material including a reinforcing fiber having an elongation to break of at least about 3.6%. The preferred fiber is a quartz fiber having an elongation to break of at least about 5%. Additionally or alternatively, the reinforcing fiber, in particular quartz fiber, has a hardness of at least about 4 on the Mohs scale, as measured on bulk material, which resists cutting by an impacting object. The composite material and specifically an epoxy/quartz fiber composite provides for weight reduction while providing fan blade containment without loss of structural integrity and with improved resistance to impact and puncture.

33 Claims, 2 Drawing Sheets

U.S. PATENT DOCUMENTS

| | | |
|---|---|---|
| 5,851,932 A | 12/1998 | Dickson et al. |
| 6,003,424 A | 12/1999 | Cordova et al. |
| 6,028,565 A | 2/2000 | Mackenzie et al. |
| 6,113,347 A | 9/2000 | Forrester |

* cited by examiner

ENGINE BLADE CONTAINMENT SHROUD USING QUARTZ FIBER COMPOSITE

This application claims the benefit of Provisional Application No. 60/345,581, filed Jan. 3, 2002, which is hereby incorporated herein by reference in its entirety.

The invention herein described relates generally to a containment shroud for high velocity projectiles and more particularly to an engine fan blade containment shroud including a wall made of a quartz fiber composite.

BACKGROUND OF THE INVENTION

High-bypass-ratio turbofan engines are used to power modern large commercial aircraft because of their overall efficiency, high thrust at low flight speeds, low jet velocity and low fuel consumption. A fan containment shroud is the largest structural component in these engines. The containment shroud is intended to contain a fan blade in the rare event of a blade loss during engine operation (the centrifugal force acting on a broken blade can cause the blade to puncture the engine nacelle). In addition, the containment shroud should retain its structural integrity after a blade-out incident to limit secondary damage caused by impact debris and to constrain out-of-balance motion of the engine's rotor after a blade or blade fragment is lost.

Two approaches are currently used to contain fan blades in modern commercial engines. The first approach (hardwall shroud design) uses an impact resistant metal alloy for a fan case with a wall thickness sufficient to prevent perforation by a fan blade and circumferential ribs for stiffness. In the hardwall shroud design, the wall thickness is much greater than the thickness required for structural loads during normal engine operation. The extra weight, which is needed only in the rare event of a blade-out, is therefore a parasitic weight that reduces overall energy efficiency during normal engine operation. The second approach (softwall shroud design) uses a thin metal alloy case that provides structural capabilities, while containment capability is provided by a fiber or fabric wrap (Kevlar®) around the case. During a blade-out event, the blade passes through the inner metal case and is captured in the outer fabric layers. Case stiffness may be provided by an isogrid rib pattern in the metal case or by using a honeycomb structure on the outside of the case. In the softwall design, the fabric wrap is a parasitic weight.

In U.S. Pat. No. 6,003,424, there is described an armor system that is said to be useful as a containment shroud for a fan-blade engine. The armor system comprises a first pliable, cut resistant fibrous layer and a second pliable fibrous layer substantially coextensive with and surrounding the first layer. The first layer is intended to engage any projectile thrown by the engine to slow its velocity, and the second layer is intended to dissipate the incoming energy and thereby resist complete penetration of the second layer by the projectile. The first layer may comprise a plurality of networks selected from the group consisting of an uncoated nonwoven network of randomly oriented fibers and an uncoated knitted, preferably tightly, network of fibers. The second layer may comprise a plurality of networks selected from the group consisting of a loosely woven network of fibers, an open knitted network of fibers, a braided network of fibers, and a nonwoven network of oriented fibers.

The '424 patent indicates a wide variety of metallic, semi-metallic, inorganic and/or organic fibers can be used, while stating it is crucial that a sufficient weight percent of cut resistant fibers or combination of fibers with high tensile properties be used to achieve the indicated properties of the layers of the armor systems. Fibers having the high tensile properties desired are those having a tenacity equal to or greater than about 10 g/d, a tensile modulus equal to or greater than about 200 g/d and an energy-to-break equal to or greater than about 8 Joules/gram (J/g), with the fibers of choice having a tenacity equal to or greater than about 35 g/d, the tensile modulus equal to or greater than about 1500 g/d and the energy-to-break equal to or greater than about 50 J/g. According to the '424 patent, these highest values for tenacity, tensile modulus and energy-to-break are generally obtainable only by employing solution grown or gel filament processes, such as are used to produce high strength polyethylene fiber known as Spectra.RTM, a product of Allied-Signal, Inc.

While the fibers of the first layer are uncoated, the fibers of the second layer are coated with a matrix material. According to the '424 patent, the proportion of matrix to filament in the network preferably is about 10 to 30%. The network preferably is comprised of a plurality of sheet-like arrays of untwisted fibers with the fibers aligned substantially parallel to one another along a common fiber direction within each array. The arrays are preferably individually impregnated with a matrix binder and stacked. According to the '424 patent, it is important that the arrays not be consolidated between networks with the matrix binder since this will stiffen the layer too much.

Heretofore it also has been proposed to use a ceramic layer on the impact surface of a composite wall of a containment shroud. The ceramic layer serves to fragment the projectile and spread the impact load over a larger area of the composite backing. According to U.S. Pat. No. 6,113,347, an annular fan containment shroud may have an interior surface with an abrasive surface texture that is capable of dulling sharp corners and edges of impacting fan blades so as to reduce the ability of the fan blade to pierce the containment shroud. The textured surface may be produced by protuberances in the form of sawtooth steps, sharp spikes or pieces of a hard material impregnated in the textured surface.

The present invention was developed to overcome the deficiencies of prior art jet engine fan blade containment shrouds and provide superior stopping power for the same or less areal weight.

SUMMARY OF THE INVENTION

The present invention provides an aircraft engine fan containment shroud including a containment structure composed of a composite material including a reinforcing fiber in a resin matrix, the reinforcing fiber having an elongation to break of at least about 3.6%, more preferably at least about 4%, still more preferably at least about 4.5%, yet more preferably at least about 5%, and most preferably between about 5% and about 7%, or higher. In a preferred embodiment, the fiber is a quartz fiber having an elongation to break of at least about 3.6%, more preferably at least about 4%, still more preferably at least about 4.5%, yet more preferably at least about 5%, and most preferably about 5.1%. Additionally or alternatively, the reinforcing fiber, in particular quartz fiber, has a hardness of at least about 4 on the Mohs scale, more preferably at least about 5 on the Mohs scale, still more preferably at least about 6 on the Mohs scale, and most preferably between about 6.5 and 7 (or higher) on the Mohs scale, as measured on bulk material. Moreover, the reinforcing fiber preferably has a tensile strength at least about 300 ksi and more preferably at least about 350 ksi.

The matrix material may be selected from thermosetting resins, thermoplastic resins, or combinations of such resins. In one embodiment, the matrix material comprises an epoxy resin, whereas in another embodiment the matrix material comprises polyether amide resin. The percent resin content by weight in a fiber prepreg may be from about 10% to about 60%, more preferably about 25% to about 50%, still more preferably between about 31% and about 45%, and most preferably about 38%+/−3%. The percent fiber content by weight in the fiber prepreg is from about 40% to about 90%, more preferably from about 50% to about 75%, still more preferably between about 55% and 69%, and most preferably about 62%+/−3%.

The composite material according to the invention may be used as the fan case in hardwall shroud systems to provide improved impact resistance and blade containment, as the fan case and/or outer wrap in softwall shroud systems, or as a containment structure in other containment systems. For high temperature applications, the use of quartz fiber with high temperature polymer matrix resins are contemplated.

The composite material provides for weight reduction while providing fan blade containment without loss of structural integrity and with improved impact/puncture resistance.

More generally, the invention provides a containment shroud composed of a composite material as above-described and specifically an epoxy/quartz fiber composite. The containment shroud (or other structure composed of a composite material as herein described) may find use in containing blades in a jet engine other than the fan blades, or in various other applications where containment of high velocity cutting or other projectiles is desired.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
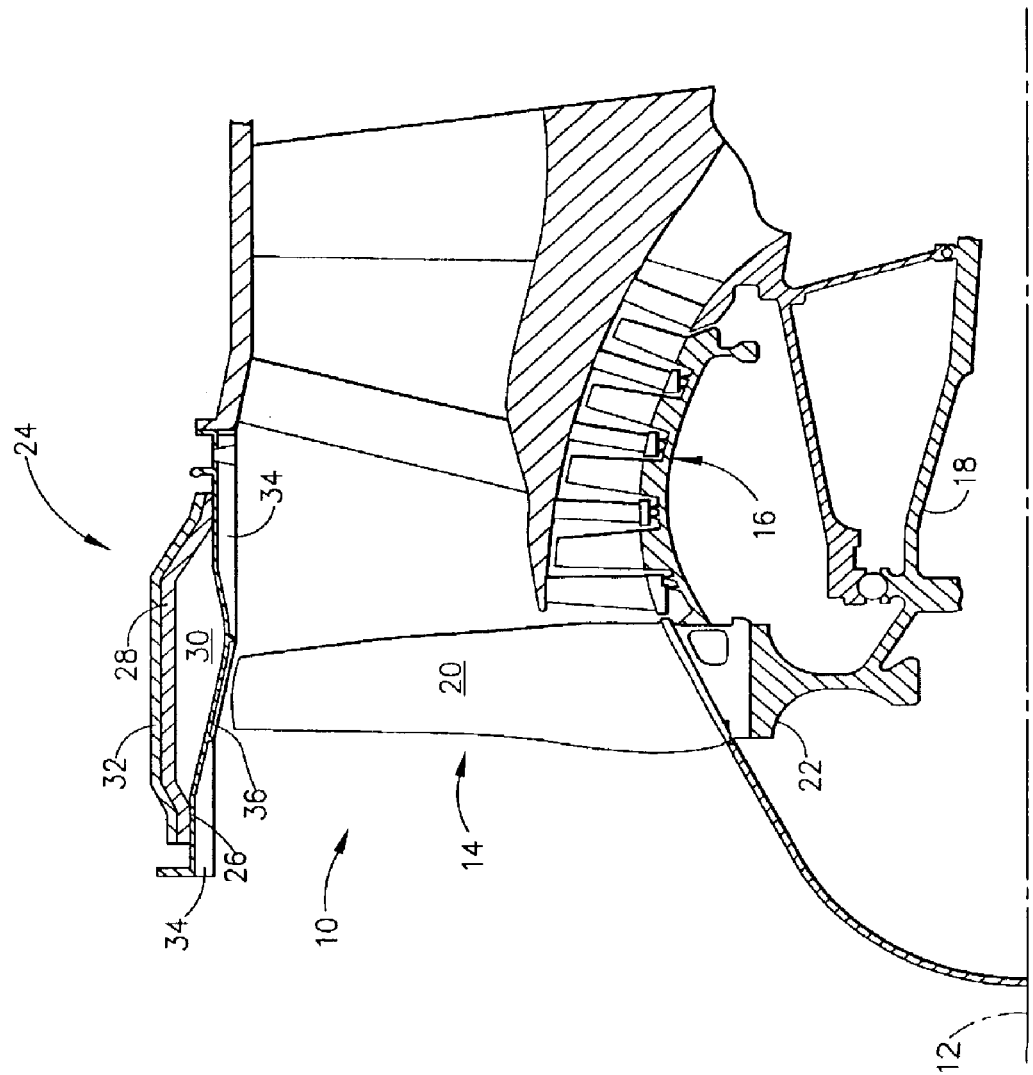
FIG. 1 is a longitudinal cross-sectional view illustrating an exemplary high bypass ratio turbofan engine incorporating a softwall-type blade containment system according to the present invention.

Referring now in detail to the drawings wherein identical reference numerals denote the same elements throughout the various views, FIG. 1 illustrates a longitudinal cross-sectional view of an exemplary high bypass ratio turbofan engine 10, such as that shown in U.S. Pat. No. 6,113,347. The engine 10 includes, in serial axial flow communication about a longitudinal centerline axis 12, conventional structures including a fan rotor 14 and a booster 16. The other conventional structures of the engine 10, such as a high pressure compressor, combustor, high pressure turbine, and low pressure turbine are not shown for clarity of illustration. The fan rotor 14 and booster 16 are drivingly connected to the low pressure turbine via a rotor shaft 18. The fan rotor 14 comprises a plurality of radially extending blades 20 (only one of which is shown in FIG. 1) mounted on an annular disk 22, wherein the disk 22 and the blades 20 are rotatable about the longitudinal centerline axis 12 of engine 10.

The engine 10 also includes a blade containment shroud generally depicted at 24. The blade containment shroud 24 comprises an annular containment casing (or case) 26 that is positioned radially outward of the blades 20 and in surrounding relationship therewith. An outer shell 28 is spaced radially outward of the casing 26 and is attached to the casing 26 at upstream and downstream locations so as to define a chamber 30 therebetween. Chamber 30, which is also known as a nesting area, may include a honeycomb structure (not shown) which is used to retain broken blades or blade fragments therein. A composite wrap 32 surrounds the outer surface of the outer shell 28. Acoustic liners 34 may be affixed to the interior surface of the containment casing 26 at locations fore and aft of the blades 20. It is noted that although FIG. 1 depicts a blade containment shroud of the type utilizing a nesting area with honeycomb structures therein and a composite material wrap, the present invention can also be used with blade containment systems of other types, including a single containment casing made from a composite material according to the invention.

In the illustrated blade containment system 24, a ballistic barrier 36 may be secured to the interior surface of the containment casing 26 in the section thereof which is axially aligned with the fan blades 20. The barrier 36 may be composed of a number of elongated ceramic tiles which are abutted side by side so as to form a continuous barrier over the interior circumferential surface of the containment casing 26. The tile surfaces facing the fan blades 20 may be provided with a roughened or abrasive surface texture. The abrasive surface assists in dulling the sharp edges and corners of a fan blade impacting thereon, thereby reducing the ability of the fan blade to pierce the containment casing 26.

Figure 2:
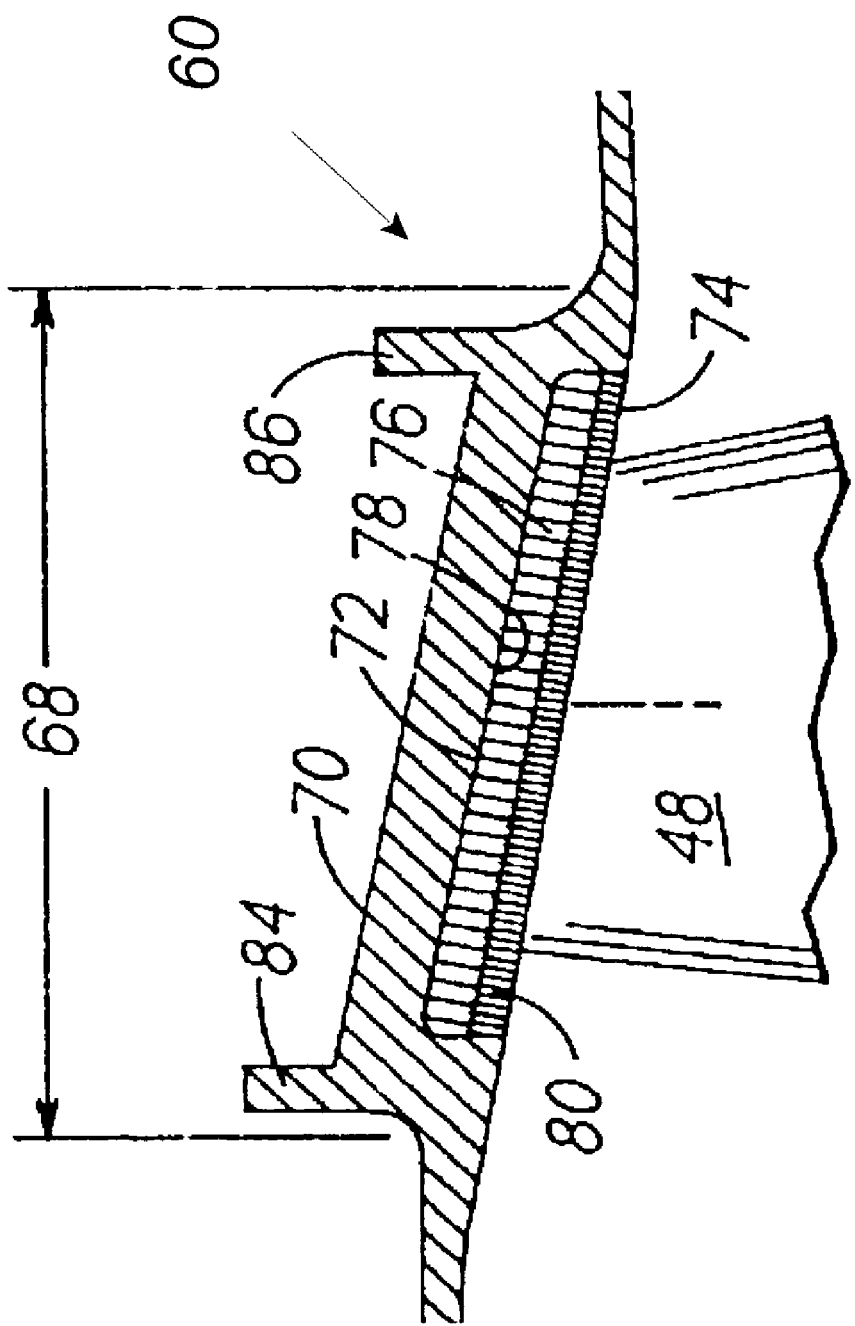
FIG. 2 is longitudinal cross-sectional view illustrating an exemplary high bypass ratio turbofan engine incorporating a hardwall-type blade containment system according to the present invention.

FIG. 2 shows another type of blade containment shroud 60, such as that shown in U.S. Pat. No. 5,823,739. The shroud 60 circumscribes an array of fan blades 48 and has an impact zone 68 which is the region where a separated blade fragment is anticipated to strike the containment shroud. A containment ring or casing 70 having sufficient thickness and rigidity to absorb the impact of a blade fragment is axially coincident with the impact zone. The containment shroud also may include an airseal 72 comprising an abradable layer 74 bonded to a substrate 76 which, in turn, is bonded to the floor 78 of a circumferentially extending channel 80 in the casing 70. Stiffening rings 84 and 86 provide additional stiffness to the casing and thus the shroud.

In accordance with the invention, the casing 26 (FIG. 1), casing 70 (FIG. 2), outer shell 28 (FIG. 1) and/or composite wrap 32 (FIG. 1) are composed of a composite material including a reinforcing fiber in a resin matrix, the reinforcing fiber having an elongation to break of at least about 3.6%, more preferably at least about 4%, still more preferably at least about 4.5%, yet more preferably at least about 5%, and most preferably between about 5% and about 7%, or higher. In a preferred embodiment, the fiber is a quartz fiber having an elongation to break of at least about 3.6%, more preferably at least about 4%, still more preferably at least about 4.5%, yet more preferably at least about 5%, and most preferably about 5.1%. Additionally or alternatively, the reinforcing fiber has a hardness of at least about 4 on the Mohs scale, more preferably at least about 5 on the Mohs scale, still more preferably at least about 6 on the Mohs scale, and most preferably between about 6.5 and 7 (or higher) on the Mohs scale, as measured on bulk material.

The percent resin content by weight in a fiber prepreg may be between about 10% to about 60%, more preferably about 25% to about 50%, still more preferably between about 31% and about 45%, and most preferably about 38%+/−3%.

The matrix material of the composite may be selected from thermosetting resins, thermoplastic resins, or combinations of such resins. As used herein, "thermosetting resins" are resins of a polymer or polymers that solidify or set irreversibly when heated or otherwise cured. Such resins do not tolerate thermal cycling and cannot be resoftened and reworked after molding, extruding or casting. As used herein, "thermoplastic resins" are resins of a polymer or polymers that soften when exposed to heat and return to their original condition when cooled to room temperature. Examples of thermosetting resins include phenolics, alkyds, amino resins, polyesters, epoxies, silicones, vinyl esters and urethanes. Examples of thermoplastic resins include polyvinyl chloride, nylons, fluorocarbons, linear polyethylenes, polyurethane prepolymers, polystyrenes, polypropylene, polyolefins and acrylic resins. The composite material comprising the reinforcement fibers and matrix material may be formed to a desired shape by any suitable forming technique, such as by using thermoforming, vacuum forming, transfer molding and other techniques.

In one embodiment of the present invention, the matrix material comprises an epoxy resin. As used herein, an epoxy resin means a thermosetting resin containing the oxirane, or epoxy group, as the reactive functionality. The oxirane group may be derived from a number of diverse methods of synthesis, for example by the reaction of an unsaturated compound with a peroxygen compound such as peracetic acid; or by the reaction of epichlorohydrin with a compound having an active hydrogen, followed by dehydrohalogenation. Methods of synthesis are well known to those skilled in the art, and may be found, for example, in the Handbook of Epoxy Resins, Lee and Neville, Eds., McGraw Hill, 1967, in chapters 1 and 2 and the references cited therein.

The epoxy resins useful in the practice of the subject invention are generally those that are commercially available and substantially di- or polyfunctional resins. In general, the functionality of the resins is from about 1.8 to about 8.

Examples of the epoxy resins which are derived from amines include tetraglycidyl diaminodiphenylmethane, triglycidyl-p-aminophenol, triglycidyl-m-aminophenol and triglycidyl aminocresol. Among these, tetraglycidyl diaminodiphenylmethane is preferred because it has excellent thermal resistance.

Examples of the epoxy resins derived from phenols include bisphenol A type epoxy resins, bisphenol F type epoxy resins, bisphenol S type epoxy resins, phenol novolak type epoxy resins, cresol novolak type epoxy resins and resorcinol type epoxy resins. Since liquid bisphenol A type epoxy resins and bisphenol F type epoxy resins have low viscosities, they are suited for blending other epoxy resins and additives.

Examples of the epoxy resins derived from compounds having carbon—carbon double bonds include alicyclic epoxy resins. Brominated epoxy resins obtained by brominating these alicyclic epoxy resins are also preferred since the water absorption of the resin is decreased and environment resistance is promoted.

The epoxy resin may be a mixture of two or more epoxy resins and may contain a mono-epoxy compound. The combination of a glycidylamine type epoxy resin and a glycidyl ether type epoxy resin is preferred because it simultaneously satisfies good thermal resistance, water resistance and processability.

Another component constituting the epoxy resin composition used in the present invention is a curing agent. Any compound having active groups which can react with epoxy group may be employed as the curing agent. Compounds having amino groups, acid anhydride groups, azide groups and hydroxy groups may preferably be employed.

For example, dicyandiamide, various isomers of diaminodiphenyl sulfone, aminobenzoates, various acid anhydrides, phenol novolak resins and cresol novolak resins may be employed. Dicyandiamide is preferred because it gives long shelf-life of prepreg. If an aromatic diamine is used as a curing agent, cured epoxy resin having good thermal resistance can be obtained. In particular, various isomers of diaminodiphenyl sulfone are best preferred in the present invention since they give cured resins with good thermal resistance. Diaminodiphenyl sulfone may preferably be used in an amount such that the amount of its active hydrogen is 0.7–1.2 equivalent with respect to the amount of the epoxy groups of the epoxy resin. As the aminobenzoates, trimethyleneglycol-di-p-aminobenzoate and neopentylglycol-di-p-aminobenzoate may preferably be used. Although the resins obtained by using those curing agents have lower thermal resistances than those obtained by using diaminodiphenyl-sulfone, since they excel in tensile strength and toughness, they may be selected depending on the intended use. If an acid anhydride represented by phthalic anhydride is used as a curing agent, cured resin with good thermal resistance is obtained, and an epoxy resin composition having low viscosity and so having excellent processability can be obtained. A phenol novolak resin or a cresol novolak resin may also preferably be used as a curing agent since ether bonds having good hydrolysis resistance are introduced into the molecular chains, so that the water resistance of the cured resin is promoted.

Further, various curing catalysts may also be employed together with the above-mentioned curing agents. A representative example of the curing catalysts is monoethylamine complex of trifluoroboron. Cyanate resins (triazine resins) may also be employed together with the epoxy resin. In this case, a curing reaction takes place between the cyanate and the epoxy groups, so that a cured resin with low water absorption can be obtained.

In one embodiment, the epoxy resin is used in combination with a another resin as the matrix material. For example, a cyanate functional or bismaleimide functional resin is combined with the epoxy resin. Cyanate resins are heat curable resins whose reactive functionality is the cyanate, or —OCN group. These resins are generally prepared by reacting a di- or poly-functional phenolic compound with a cyanogen halide. Bismaleimide resins are heat curable resins containing the maleimido group as the reactive functionality. The term bismaleimide as used herein includes mono-, bis-, tris-, tetrakis-, and higher functional maleimides and their mixtures. Bismaleimide resins thus defined are prepared by the reaction of maleic anhydride or a substituted maleic anhydride such as methylmaleic anhydride, with an aromatic or aliphatic di- or polyamine.

Examples of useful epoxy resins include those described in U.S. Pat. Nos. 6,313,248, 6,265,491, 6,242,083, 6,139,942, 5,932,635, 5,605,745 and 5,532,296, the disclosures of which are hereby incorporated by reference.

A preferred composite is an epoxy/quartz fiber composite of the type previously used successfully for many years in the construction of radomes. Radomes are used to house and protect radar components in aircraft from wind load and the elements, such as rain and bird strikes. In addition to their desirable electromagnetic properties, epoxy/quartz fiber composites have been found to provide superior resistance to hail impacts than prior composites such as the previously used Kevlar® fiber and glass fiber composites. While hail impacts pale in severity and magnitude to the impact conditions that occur during a fan blade-out condition in a jet engine, the applicant has discovered that quartz fiber composites and especially epoxy/quartz fiber composites afford advantages over other fiber composites previously used in fan cases. In one embodiment, the composite comprises an epoxy prepreg containing quartz fibers. Examples of useful epoxy prepregs include those commercially available from FiberCote Industries Inc. and particularly FiberCote E761, and the Bryte BT250E epoxy resin system.

Another reinforced resin system is a polyether amide resin (PEAR) system. PEAR is a high-performance family of composite resins that offer excellent value and performance that combine strength, low weight, and chemical and temperature resistance. It doesn't burn easily, and gives off less toxins when subjected to flames, and its easy to formulate and process.

Another reinforced resin system is reinforced thermoplastic laminate (RTL). Consolidated flat sheets of PPS or PEI thermoplastic resins having desired thicknesses may be formed into desired shapes, using thermoforming or other suitable processes.

The cross-sections of fibers for use in accordance with the present invention may vary. The fibers may be of any suitable diameter. However, in one embodiment, the fibers may be from 8 to 16 microns in diameter, and more particularly from 9 to 14 microns in diameter. Preferred fibers are Quartzel® fibers available from Saint-Gobain Quartz. Quartzel Yarn is available in a variety of assemblies based upon two basic fiber (filament) diameters, 9 or 14 microns, and may be used in a variety of textile processes including weaving, braiding, knitting, etc.

The fibers may be of circular or of flat or of oblong or of irregular or regular multi-lobal cross-section having one or more regular or irregular lobes projecting from the linear or longitudinal axis of the filament. It is particularly preferred that the fibers be of substantially circular, flat or oblong cross-section, most preferably the former.

The fibers preferably are woven to form a fabric. The fibers may be prepregged before weaving or the fabric may be prepregged after weaving. One or more fabric layers or plies may be laid up to form a consolidated casing or other structure of desired shape and/or thickness suitable for the intended application.

The present invention also contemplates nonwoven fiber networks of randomly oriented fibers, at least one of which comprises discontinuous fiber, preferably staple fiber, having a length ranging from about 0.25 to 10.0 inches (0.63 to 25.4 cm), more preferably from about 1.0 to 8.0 inches (2.54 to 20.3 cm), most preferably from about 2.0 to 6.0 inches (5.1 to 15.2 cm). There are several methods to lay such a completely random and discontinuous network of fibers, for example by carding or fluid laying (air or liquid), as are conventional in the art. Consolidation of the network for handling, i.e., bonding of the network of fibers, can occur by any of the following means: mechanically, e.g., needle punching; chemically, e.g., with an adhesive; and thermally, with a fiber to point bond or a blended fiber with a lower melting point. One consolidation method is needle punching, alone or followed by one of the other methods, and one nonwoven network is a needle punched discontinuous fiber length felt.

The invention also contemplates continuous lengths of fiber wound circumferentially in relation to the axis of a containment shroud. However, fabrics generally are preferred.

The casing 26, casing 70 and/or composite wrap 32 may be formed by laying up or wrapping prepregged woven fibers networks or layers to form a multilayer structure that can be cured as by heating. Alternatively, a fiber prepreg may be wrapped circumferentially to form a containment ring structure. Although the use of prepregged fibers or fabrics is preferred, uncoated fibers or fiber fabrics/networks may be formed into a desired shape and then the resin added by suitable means.

The overall thickness of the casing 26, casing 70, outer shell 28 and/or composite wrap 32 (FIGS. 1 and 2) may be varied as needed to provide the desired strength and performance requirements for a given application. For example, a composite quartz/epoxy panel of about ¼ inch thick, made using 20 woven fabric plies with combined thickness of 0.24 inch and a weight of 2.07 lb/ft$^2$ yielded a performance comparable to Inconel 718 metal alloy during blade impact tests on curved and flat panels. More particularly, it was found that such panel had approximately the same stopping power and resistance to puncture as panels of similar thickness made from Iconel 718 metal alloy for the same areal weight. It was also found that there was no directional effect with respect to warp vs. fill of the quartz fiber fabric.

Particularly useful quartz fiber fabrics are Astroquartz® II or III fabrics. These fabrics are woven from high tensile strength, high purity (99.95%) fused silica fiber yarns. Two fabric styles of Astroquartz® III fabrics are available, namely 4503 and 4581. Epoxy laminates made from these fabrics have near zero coefficient of thermal expansion and excellent mechanical properties in composites. Epoxies provide desirable performance for temperatures up to about 300° F. or higher. For high temperature applications of 600° F. or greater, the use of quartz fiber with high temperature resins such as polyimides is contemplated.

The following is a table showing a comparison of various properties of various fibers including quartz fiber and other reinforcing fibers, including Spectra® fiber and Kevlar® fibers which previously have been used in containment shrouds.

|  | E-Glass | S-Glass | Quartz | Spectra | Kevlar 49 | Kevlar 29 | Steel |
| --- | --- | --- | --- | --- | --- | --- | --- |
| Density (pci) | 0.094 | 0.090 | 0.080 | 0.035 | 0.052 | 0.052 | 0.281 |
| Tensile Strength (ksi) | 250 | 370 | 350 | 375 | 330 | 330 | 400 |
| Tensile Modulus (msi) | 10.4 | 12.6 | 11.3 | 17.0 | 18.0 | 12.0 | 29.0 |

-continued

|  | E-Glass | S-Glass | Quartz | Spectra | Kevlar 49 | Kevlar 29 | Steel |
|---|---|---|---|---|---|---|---|
| Elongation to Break % | 2.4 | 2.9 | 5.1 | 3.5 | 1.8 | 2.8 | 1.4 |
| Source | 1 | 1 | 2 | 2 | 1 | 1 | 2 |

1 Mechanical Behavior and Properties of Composite Materials, Vol 1
2 Various Supplier Data Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A ballistic structure comprising a wall composed of quartz fiber having an elongation to break of at least about 5%.

2. A containment shroud for high velocity projectiles, the containment shroud comprising a wall that defines an annular-shaped containment shell composed of a composite material including a reinforcing fiber having an elongation to break of at least about 5%.

3. A containment shroud as set forth in claim 2, comprising an inner wall surrounded by the containment shell, the inner wall being composed of a ceramic material having an interior surface, and at least a portion of the interior surface has an abrasive surface texture.

4. A containment shroud for surrounding a plurality of blades of a turbo-machine, the containment shroud comprising a wall that defines an annular-shaped containment shell composed of a composite material including a reinforcing fiber having an elongation to break of at least about 5%.

5. A containment shroud as set forth in claim 4, wherein the fiber has an elongation to break of between at least about 5% and about 7%.

6. A containment shroud as set forth in claim 4, wherein the fiber has a hardness of at least about 4 on the Mohs scale.

7. A containment shroud as set forth in claim 4, wherein the fiber has a hardness of at least about 5 on the Mohs scale.

8. A containment shroud as set forth in claim 4, wherein the fiber has a hardness of at least about 6 on the Mohs scale.

9. A containment shroud as set forth in claim 4, wherein the fiber has a hardness of between about 6.5 and 7 on the Mohs scale.

10. A containment shroud as set forth in claim 4, wherein the composite has an epoxy resin matrix.

11. A containment shroud as set forth in claim 10, wherein the percent resin content by weight of the resin in a fiber prepreg is from about 10% to about 60%.

12. A containment shroud as set forth in claim 10, wherein the percent resin content by weight of the resin in a fiber prepreg is from about 25% to about 50%.

13. A containment shroud as set forth in claim 10, wherein the percent resin content by weight of the resin in a fiber prepreg is between about 31% and about 45%.

14. A containment shroud as set forth in claim 10, wherein the percent resin content by weight of the resin in a fiber prepreg is about 38%+/−3%.

15. A containment shroud as set forth in claim 4, comprising a fan case including said wall.

16. A containment shroud as set forth in claim 4, comprising a fan case, and said wall is wrapped around said fan case.

17. A containment shroud for surrounding a plurality of blades of a turbo-machine, the containment shroud comprising a wall that defines an annular-shaped containment shell composed of quart fiber having an elongation to break of at least about 5%.

18. A containment shroud as set forth in claim 17, wherein the quartz fiber has an elongation to break of between at least about 5% and about 7%.

19. A containment shroud as set forth in claim 17, wherein the quartz fiber has a hardness of at least about 4 on the Mohs scale.

20. A containment shroud as set forth in claim 17, wherein the quartz fiber has a hardness of at least about 5 on the Mohs scale.

21. A containment shroud as set forth in claim 17, wherein the quartz fiber has a hardness of at least about 6 on the Mohs scale.

22. A containment shroud as set forth in claim 17, wherein the quartz fiber has a hardness of between about 6.5 and 7 on the Mohs scale.

23. A containment shroud as set forth in claim 17, wherein the composite has an epoxy resin matrix.

24. A containment shroud as set forth in claim 23, wherein the percent resin content by weight of the resin in a fiber prepreg is from about 10% to about 60%.

25. A containment shroud as set forth in claim 23, wherein the percent resin content by weight of the resin in a fiber prepreg is from about 25% to about 50%.

26. A containment shroud as set forth in claim 23, wherein the percent resin content by weight of the resin in a fiber prepreg is between about 31% and about 45%.

27. A containment shroud as set forth in claim 23, wherein the percent resin content by weight of the resin in a fiber prepreg is about 38%+/−3%.

28. A containment shroud as set forth in claim 17, comprising a fan case including said wall.

29. A containment shroud as set forth in claim 17, comprising a fan case, and said wall is wrapped around said fan case.

30. A containment shroud as set forth in claim 17, wherein said composite includes a resin matrix having a melting temperature of at least about 300° F.

31. In a turbomachine hang a plurality of blades mounted to a disk and a blade containment shroud surrounding the blades, the containment shroud comprising a wall that defines an annular-shaped containment shell composed of quartz fiber having an elongation to break of at least about 5%.

32. A containment shroud as set forth in claim 31, comprising a fan case including said wall.

33. A containment shroud as set forth in claim 31, comprising a fan case, and said wall is wrapped around said fan case.

* * * * *